(12) United States Patent
Ismert et al.

(10) Patent No.: US 11,745,126 B2
(45) Date of Patent: Sep. 5, 2023

(54) POINT-OF-USE SOLIDS INTERCEPTOR

(71) Applicant: Striem LLC, Kansas City, KS (US)

(72) Inventors: Vincent Ismert, Kansas City, MO (US); Gabe Ismert, Shawnee Mission, KS (US); Rusty Shaver, Tonganoxie, KS (US); Montgomery Jones, Kansas City, KS (US)

(73) Assignee: Striem LLC, Kansas City, KS (US)

( * ) Notice: Subject to any disclaimer, the term of this patent is extended or adjusted under 35 U.S.C. 154(b) by 179 days.

(21) Appl. No.: 17/134,819

(22) Filed: Dec. 28, 2020

(65) Prior Publication Data

US 2021/0197101 A1 Jul. 1, 2021

Related U.S. Application Data (60) Provisional application No. 62/955,008, filed on Dec. 30, 2019.

(51) Int. Cl.
*B01D 29/33* (2006.01)
*C01F 1/00* (2006.01)
(Continued)

(52) U.S. Cl.
CPC .............. *B01D 29/33* (2013.01); *B01D 35/30* (2013.01); *C02F 1/001* (2013.01);
(Continued)

(58) Field of Classification Search
CPC .. B01D 29/33; B01D 35/30; B01D 2201/304; B01D 2201/306; B01D 35/02;
(Continued)

(56) References Cited

U.S. PATENT DOCUMENTS 4,495,072 A * 1/1985 Fields ................... B01D 29/17
55/330
4,774,853 A * 10/1988 Takahashi ............ B01D 46/009
210/167.02
(Continued)

FOREIGN PATENT DOCUMENTS

JP 6060388 B2 * 1/2017

OTHER PUBLICATIONS

JP6060388B2—English Translation (Year: 2017).*
(Continued)

*Primary Examiner* — Madeline Gonzalez
(74) *Attorney, Agent, or Firm* — HOVEY WILLIAMS LLP (57) ABSTRACT

A solids interceptor and methods of using the same. The solids interceptor includes a tank including an open end, a wastewater inlet, and one or more wastewater outlets. A basket assembly is removably attachable to the tank via the open end between an operable position and a removed position. The basket assembly may seal the open end when in the operable position and expose the open end of the tank to a surrounding environment when in the removed position. A first and second outlet may extend away from an interior of the tank in a first and direction, respectively, with the second direction being oriented at an angle with respect to the first direction. The basket assembly may include a seal that is compressed about a circumferentially extending corner provided on the tank to thereby seal the open end of the tank and the plumbing system.

17 Claims, 11 Drawing Sheets

(51) Int. Cl.
  *B01D 35/30* (2006.01)
  *C02F 1/00* (2023.01)
  *C02F 103/00* (2006.01)

(52) U.S. Cl.
  CPC .. *B01D 2201/304* (2013.01); *B01D 2201/306* (2013.01); *C02F 2103/002* (2013.01); *C02F 2201/004* (2013.01)

(58) Field of Classification Search
  CPC . B01D 29/35; B01D 2201/4015; C02F 1/001; C02F 2103/002; C02F 2201/004; C02F 2303/24
  USPC ....... 210/238, 282, 435, 439, 446, 447, 449, 210/450, 452, 455, 457, 459, 460, 463, 210/470
  See application file for complete search history.

(56) References Cited

U.S. PATENT DOCUMENTS

| | | | |
|---|---|---|---|
| 6,167,733 B1 * | 1/2001 | Lee | D06F 39/10 68/18 F |
| 2005/0072725 A1 * | 4/2005 | Swanson | B01D 27/08 210/317 |
| 2005/0205485 A1 * | 9/2005 | Jorgensen | B01D 29/23 210/485 |
| 2009/0314706 A1 * | 12/2009 | Kim | B01D 65/025 210/462 |

OTHER PUBLICATIONS

MIFAB, Inc., Mini-PL Mini Max Wet Waste Interceptor, Jan. 22, 2019, available at https://www.mifab.com/Catalog/MINI-PL_Specification-Sheet.pdf (1 page).

MIFAB, Inc., Mi-Solid-Sa Side Access Solids Interceptor, Aug. 29, 2013, available at https://www.mifab.com/Catalog/Library/mi-solid-sa.pdf (1 page).

Canplas Industries Ltd., Endura Grease Managment Endura InLine Drain Strainer, accessed Apr. 8, 2021, available at https://canplas.com/endura/wp-content/uploads/download-manager-files/in-Line-Drain-Strainer-CAN-ENG.pdf (2 pages).

Zurn Industries, Inc., Z-1182 Side Access Solids Interceptor, Mar. 14, 2001, available at https://www.zurn.com/media-library/web_documents/pdfs/specsheets/59266-pdf (1 page).

* cited by examiner

POINT-OF-USE SOLIDS INTERCEPTOR

CROSS-REFERENCE TO RELATED APPLICATION

This nonprovisional application claims the benefit of priority to U.S. Provisional Application No. 62/955,008, filed Dec. 30, 2019, and titled "POINT-OF-USE SOLIDS INTERCEPTOR," which is incorporated by reference herein in its entirety.

TECHNICAL FIELD

The present invention generally relates to solids interceptors. More particularly, aspects of the invention relate to solids interceptors including a removable basket assembly for collecting and accumulating solid waste provided in wastewater.

BACKGROUND OF THE INVENTION

Solids interceptors (also known as solids collectors) are used in a wide array of facilities in which solids pose a threat to the proper functioning of the facility's drainage system. These include, among others, laundry facilities, commercial kitchens, pet washing facilities and kennels, art room sinks at educational institutions, barber shops and hair salons, and food processing facilities.

Generally, solids interceptors are installed along the facility's drain line to separate solid waste from the facility's wastewater before the wastewater is piped to a disposal site such as a septic tank or a sewer system. The solid waste remains trapped within the interceptor while the liquid waste flows through the interceptor and continues to the disposal site.

Known point-of-use solid interceptors may employ a cone-shaped filter or similar screen within a pipe fitting, which in turn is installed along the drain line of a plumbing system. Solids-laden wastewater enters the interceptor and is forced through the filter such that the solid waste therein—such as, for example, lint, food waste, hair, plaster, paint, among others—is caught by the filter and ultimately settles within the fitting. The liquid waste that passes through the filter then continues to the disposal site. Collecting the solid waste in the interceptor prevents clogs and other damage to the facility's drainage system and reduces the amount of solid waste flowing to water treatment facilities.

Periodically a user must remove a cap or the like of the interceptor and empty the solid contents from within the pipe fitting. Often, however, a user may forget to regularly do so causing the interceptor to become overloaded, which results in slow draining or even complete clogging of the fixture being serviced. In any event, emptying the solids interceptor may require special tools (a pipe wrench or the like to remove the cap) and often is very messy because standing water and the collected solids run out of the fixture once the cap is removed. Moreover, such known interceptors include only one dedicated inlet and outlet, providing few options for installation of the interceptor.

There is thus a need for an improved solids interceptor that can effectively separate solids from wastewater in a variety of applications and installations. There is a further need for a solids interceptor that is easily accessed and emptied as solid waste collects within the solids interceptor.

SUMMARY OF THE INVENTION

Embodiments of the present invention are directed to improved solids interceptors, such as point-of-use solids interceptors or others, capable of use in a variety of applications and installations. More particularly, embodiments of the present invention are directed to improved solids interceptors that are easily accessible for cleaning out solid waste collected therein and methods of separating solid waste from wastewater using such solids interceptors.

For example, some embodiments of the invention are directed to a solids interceptor for separating solid waste from wastewater in a plumbing system. The solids interceptor includes a tank including an open end, a wastewater inlet, and one or more wastewater outlets. The solids interceptor also includes a basket assembly removably attachable to the tank via the open end between an operable position and a removed position. When the basket assembly is in the operable position, the basket assembly seals the open end of the tank and the plumbing system, and, when the basket assembly is in the removed position, the open end of the tank and the plumbing system are open to a surrounding environment.

Other embodiments of the invention are directed to another solids interceptor for separating solid waste from wastewater in a plumbing system. The solids interceptor includes a tank including an open end, a wastewater inlet, and a plurality of wastewater outlets. The solids interceptor also includes a basket assembly removably attachable to the tank via the open end between an operable position and a removed position. The plurality of wastewater outlets are configured such that a first outlet of the plurality of wastewater outlets extends away from an interior of the tank in a first direction, and such that a second outlet of the plurality of wastewater outlets extends away from the interior of the tank in a second direction, the second direction being oriented at an angle with respect to the first direction.

Still other embodiments of the invention are directed to another solids interceptor for separating solid waste from wastewater in a plumbing system. The solids interceptor includes a tank including an open end, a wastewater inlet, and one or more wastewater outlets. The solids interceptor also includes a basket assembly removably attachable to the tank via the open end between an operable position and a removed position. The basket assembly includes a seal, and the tank includes a circumferentially extending corner at the open end. When the basket assembly is in the operable position, the seal is compressed about the circumferentially extending corner to thereby seal the open end of the tank and the plumbing system.

Additional advantages and features of the present invention will be set forth in part in a description which follows, and in part will become apparent to those skilled in the art upon examination of the following or may be learned from practice of the invention.

BRIEF DESCRIPTION OF THE DRAWINGS

The present invention is described in detail below with reference to the attached drawing figures, in which like numerals represent the same components, and wherein.

DETAILED DESCRIPTION

Figure 6:
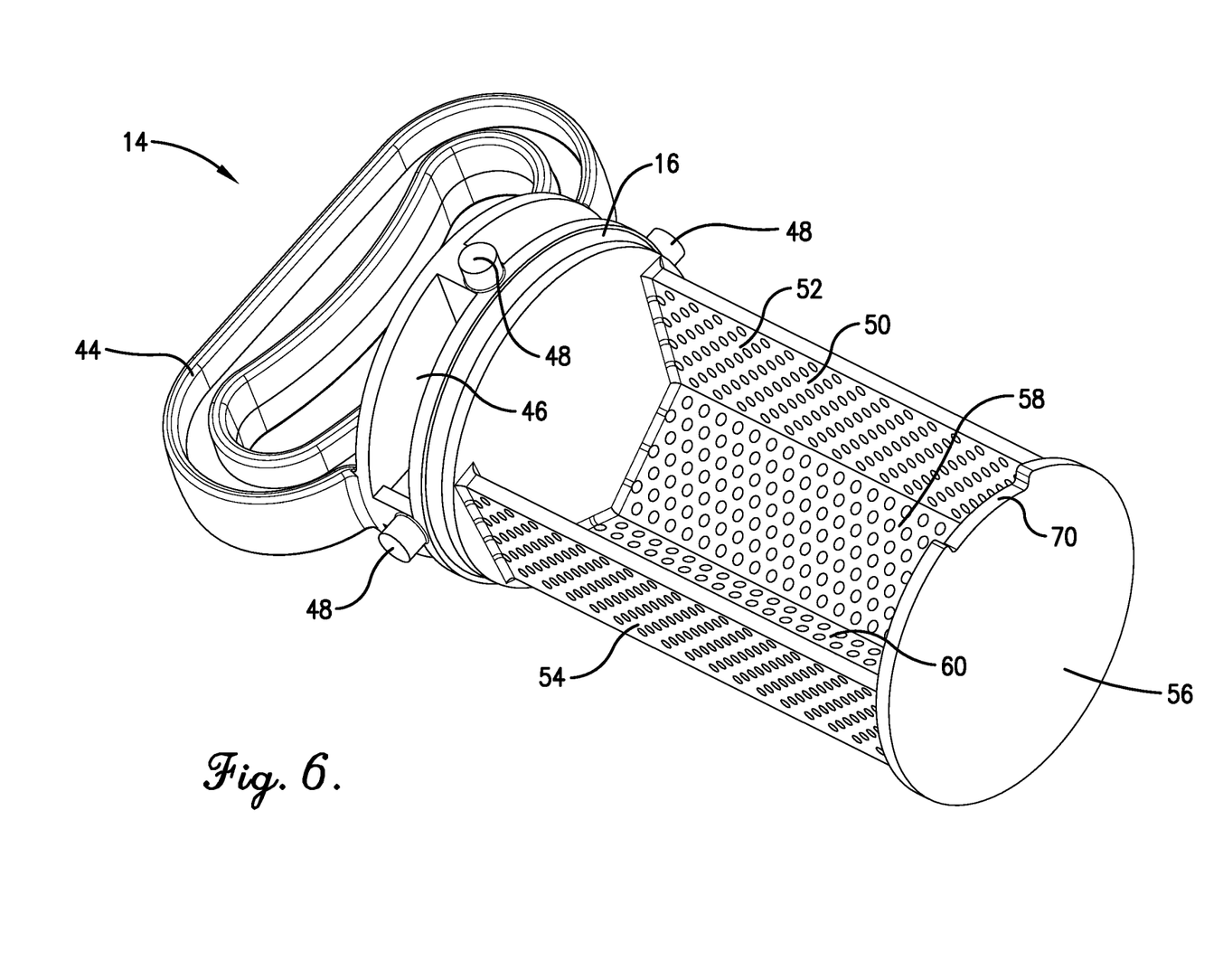
FIG. 6 is a perspective view of the basket assembly of the solids interceptor shown in FIGS. 1-5.

Embodiments of the instant invention will be described in detail with reference to the accompanying figures. First, FIGS. 1-5 show a solids interceptor 10 according to one embodiment of the invention, including a basket assembly 14 thereof shown in an installed or operable state in FIGS. 2-5, and shown in a removed state in FIG. 6. The solids interceptor 10 generally includes a main body 12 housing the removable basket assembly 14. A seal 16 such as an O-ring or the like is compressed between the main body 12 and a cover 46 of the removable basket assembly 14. In some embodiments the seal 16 is received within a circumferential seal groove 66 extending about the perimeter of the cover 46 and presses against a circumferentially extending corner 64 of the main body 12, which will be discussed in more detail below.

The main body 12 generally includes a cylindrical tank 18 that extends in an axial direction substantially from an open end 28 of the main body 12 and/or a receiving portion 32 of the main body 12 to a closed end 30 of the main body 12. The main body 12 and/or the cylindrical tank 18 can be constructed from any suitable material and in some embodiments is ¼-inch-thick PVC or the like. The cylindrical tank 18 may be any desired size to accommodate the intended use or application.

An inlet 20 to the solids interceptor 10 extends generally upright from the cylindrical tank 18 near a center thereof. The inlet 20 is configured to couple to a plumbing system such as the drainpipe of a plumbing fixture (e.g., sink), which will be discussed in more detail below in connection with FIGS. 11A and 11B. In that regard, the inlet 20 may be any desired coupling and in some embodiments has a nominal diameter of between one and four inches in diameter, and more preferably may have an nominal diameter of two inches. More particularly, the inlet 20 may constructed from 2-inch schedule 40 plain end pipe.

Figure 1:
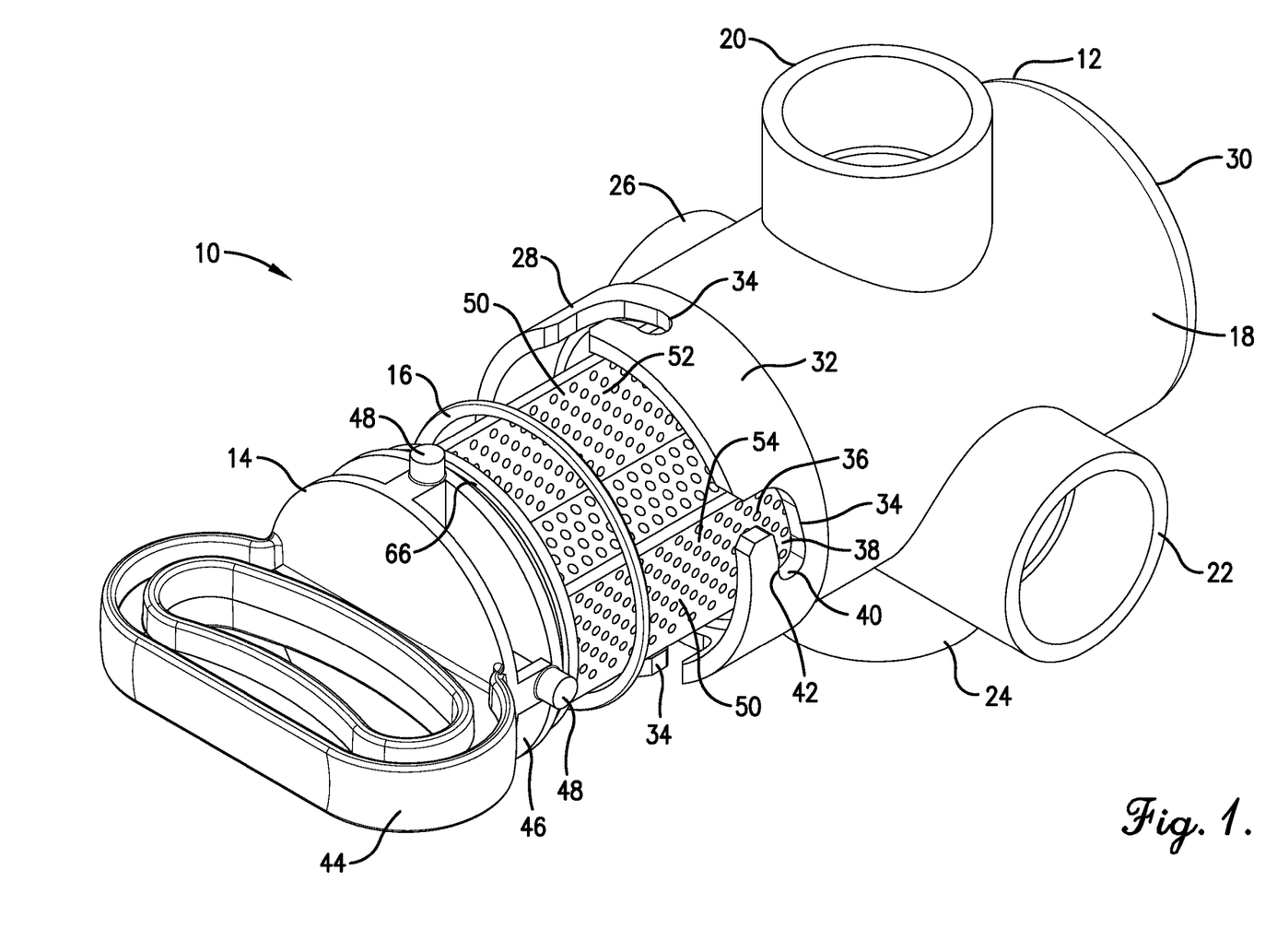
FIG. 1 is an exploded, perspective view of a solids interceptor according to aspects of the invention.
Figure 2:
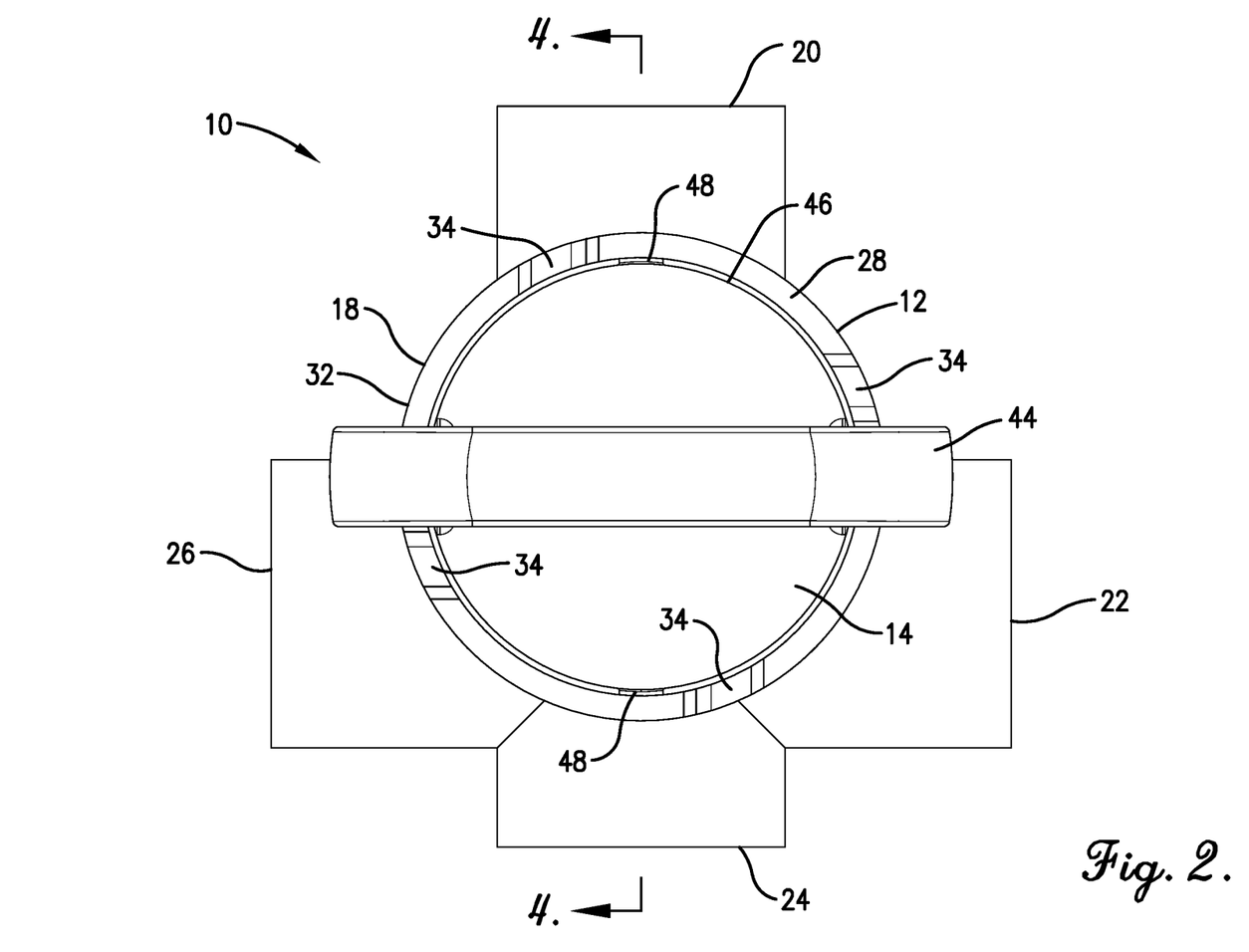
FIG. 2 is a front view of the solids interceptor shown in FIG. 1 with the basket assembly thereof shown in an operable position.

The solids interceptor 10 includes one or more outlets such as, in some embodiments, three outlets 22, 24, and 26. The first outlet 22, second outlet 24, and third outlet 26 extend outward from a bottom of the cylindrical tank 18. More particularly, as best seen in FIGS. 1 and 2, the first and third outlets 22, 26 extend generally horizontally from the cylindrical tank 18, and the second outlet 24 extends generally vertically downward from a bottom of the cylindrical tank 18. In this regard, the second outlet 24 extends generally perpendicular to the first and third outlets 22, 26, but in other embodiments the outlets 22, 24, 26 may be otherwise configured such that, for example, one of the outlets 22, 24, 26 extends at an oblique angle with respect to another one of the outers 22, 24, 26.

Figure 7:
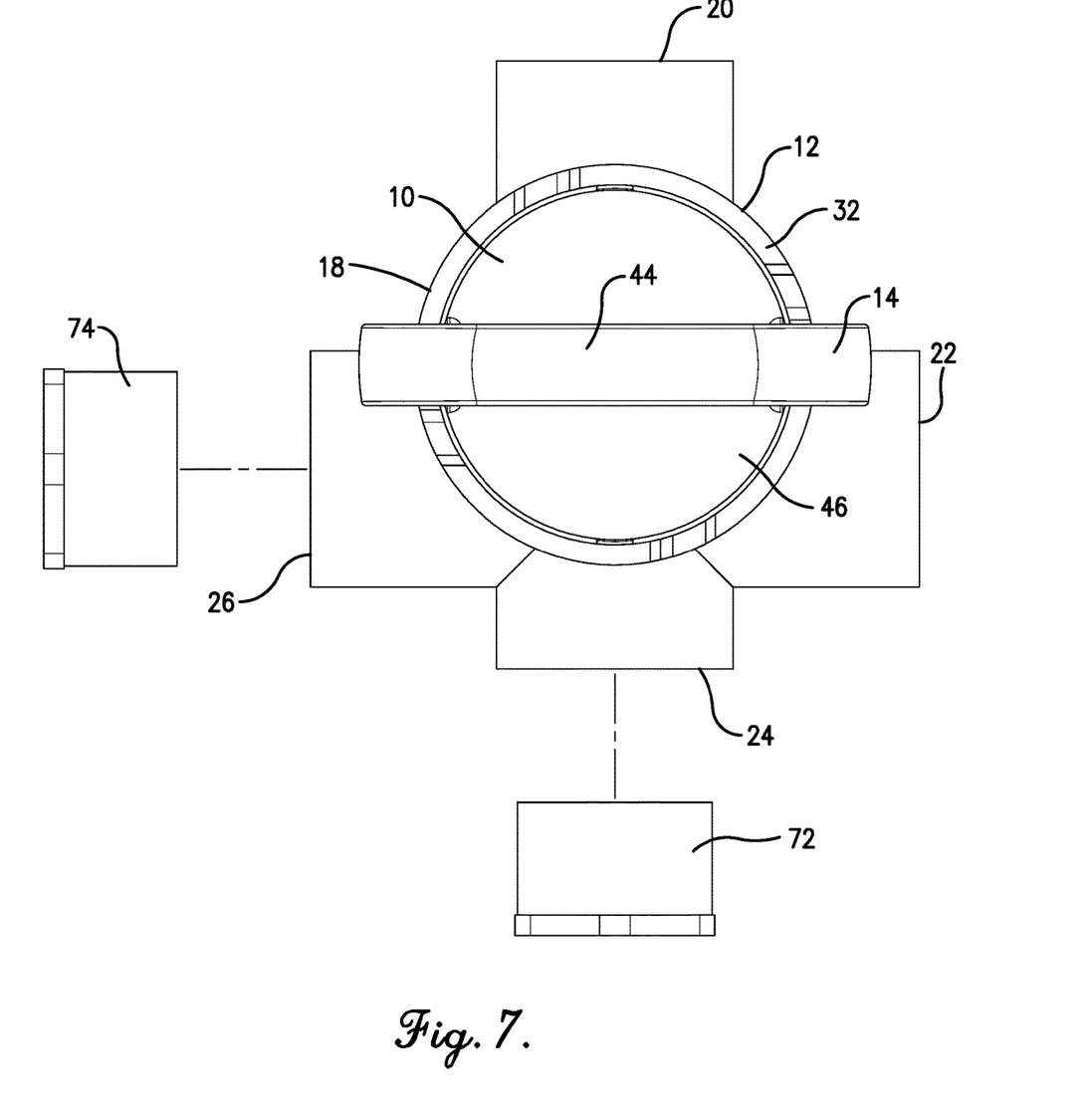
FIG. 7 is a front view of the solids interceptor shown in FIGS. 1-5 and including two plugs configured to cap unused outlets of the solids interceptor.

During installation, a user can choose the outlet(s) 22, 24, 26 most convenient for the particular application for coupling to the drain line and then seal the unused outlet(s) 22, 24, 26 in a watertight manner. In this regard, in some embodiments the solids interceptor 10 may additionally include two watertight caps 72, 74 (FIG. 7) for sealing the unused outlet(s) 22, 24, 26. When less than all of the outlets are to be utilized, a user will place a watertight cap 72, 74 in each unused outlet (in the depicted embodiment, the second and third outlets 72 and 74), and coupled the watertight caps 72, 74 to the outlets using, e.g., PVC cement or similar. As with the inlet 20, the outlets 22, 24, and 26 may be any desired sized coupling and in some embodiments are between one and four inches in diameter, and more preferably may have a nominal diameter of two inches. More particularly, the outlets 22, 24, and 26 may be constructed from 2-inch schedule 40 plain end pipe.

The main body 12 includes a receiving portion 32 provided proximate the open end 28 thereof. As will become more apparent, the receiving portion 32 mates to and interlocks with a cover 46 of the removable basket assembly 14, compressing the seal 16 therebetween. The receiving portion 32 is generally ring-shaped and, in some embodiments, has an outer diameter slightly larger than the outer diameter of the cylindrical tank 18. Thus, in embodiments where the outer diameter of the cylindrical tank 18 is about four inches, the outer diameter of the receiving portion 32 may be approximately 4⅞ inches. The outer diameter of the receiving portion 32 may be any desirable size without departing from the scope of the invention. For example, in some embodiments the outer diameter of the receiving portion 32 may be the same size as the outer diameter of the cylindrical tank 18.

Figure 3:
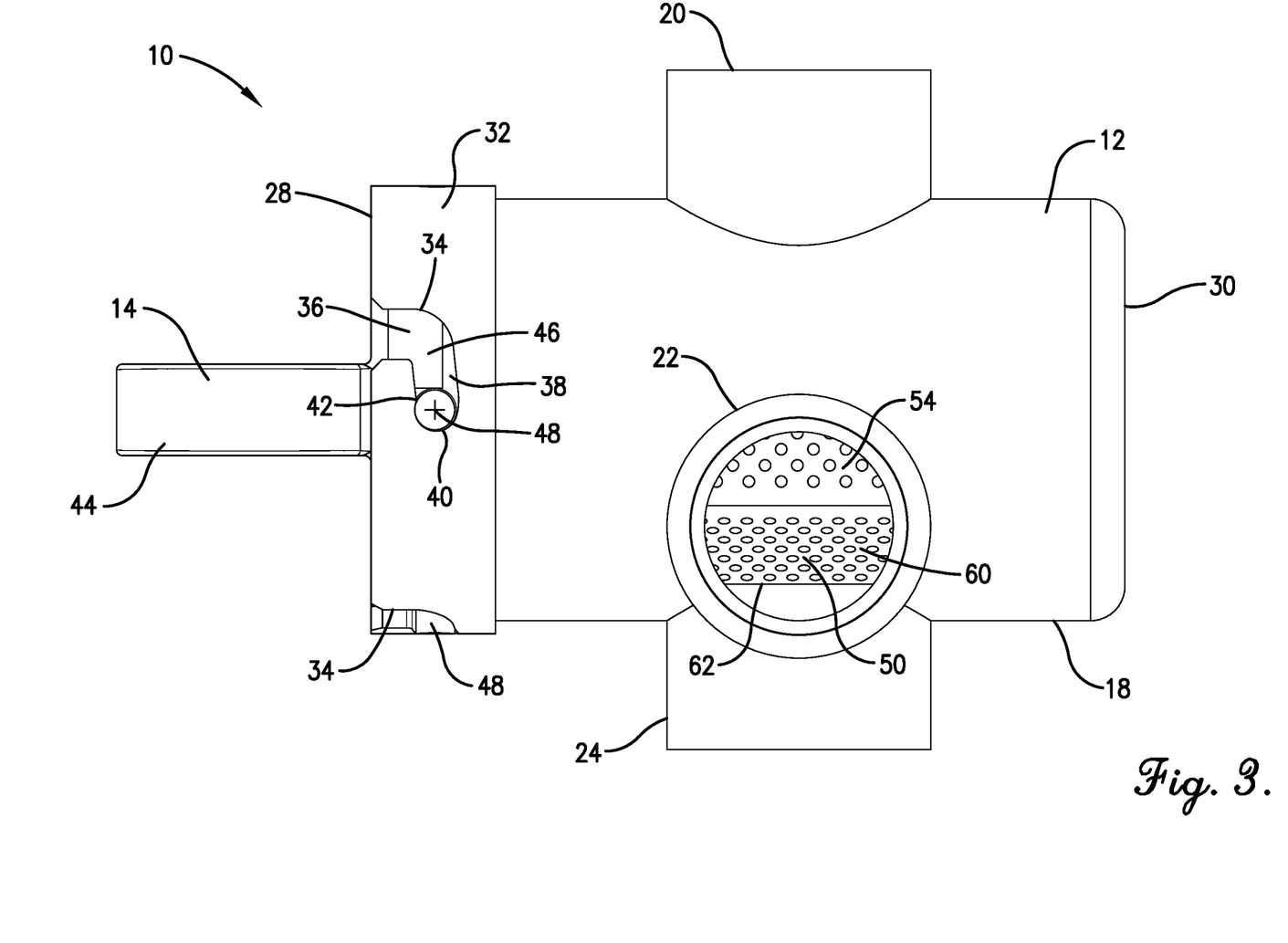
FIG. 3 is a side view of the solids interceptor shown in FIGS. 1-2.

The receiving portion 32 includes a circumferential array of grooves 34, which in the depicted embodiment are substantially J-shaped. More particularly, the depicted embodiment includes four grooves 34 circumferentially arrayed about the receiving portion 32, but in other embodiments the receiving portion 32 may include more or less grooves without departing from the scope of the invention. As best seen in FIGS. 1 and 3, when the grooves 34 are substantially J-shaped they include a generally axially extending first leg 36, a generally circumferentially extending second leg 38, and a substantially U-shaped boss seat 40 located at a distal end of the second leg 38 and shaped and sized to receive a corresponding boss 48 on the removable basket assembly 14, which will be discussed in more detail. In some embodiments, the second leg 38 includes an elbow 42, with at least a portion of the boss seat 40 extending further, in the axial direction, towards the open end 28 of the main body 12 than the elbow 42. More particularly, with reference to FIG. 3, at least a portion of the boss seat 40 extends further left in that figure than the elbow 42. In this regard, the boss 48 will lock into place after passing the elbow 42 and being pressed into the boss seat 40, which will be discussed in more detail.

The removable basket assembly 14 generally includes a cover 46 with a handle 44 projecting from a first axial end thereof and a filter tray 50 projecting from an opposing second axial end. In some embodiments, the basket assembly 14 may be integrally formed (e.g., injection molded) such that the handle 44, cover 46, and filter tray 50 are one integral piece. In some embodiments one or more components of the removable basket assembly 14 are clear to permit visual inspection of the filter tray 50 and waste accumulated therein, which will be discussed in more detail below. For example, in some embodiments the basket assembly 14 (or at least a portion thereof) may be formed from a clear or semi-transparent thermoplastic. In one non-limiting example, the basket assembly 14 (or at least a portion thereof) may be formed from a clear or semi-transparent polycarbonate.

The cover 46 includes a circumferential array of bosses 48, the number of which will correspond to the number of grooves 34 included within the receiving portion 32. For the depicted embodiment, the receiving portion 32 includes four evenly spaced grooves 34, and the cover 46 thus includes four evenly spaced bosses 48. The bosses 48 are generally cylindrical and project radially outward from a circumferentially outwardly facing surface of the cover 46.

In the depicted embodiment the filter tray 50 is a V-bottomed basket or filter bounded on one axial end by the cover 46 and on the opposing axial end by a distal end wall 56. The filter tray 50 generally includes two upstanding perforated sidewalls 52 and 54, and two perforated bottom walls 58 and 60. The upstanding perforated sidewalls 52 and 54 are substantially vertical when the solids interceptor 10 is in the assembled state with the basket assembly 14 in an operable position (FIGS. 2-5), and the perforated bottom walls 58 and 60 generally extend at oblique angles with respect to the sidewalls 52 and 54 and come together at the lowermost edge 62 of the filter tray 50 (FIGS. 3-4, 6) forming a generally V-shape in cross-section.

The solids interceptor 10 is configured to be installed along a wastewater drain line to remove solid waste contained in wastewater. The solids interceptor 10 may be used in a facility that includes solid-laden wastewater such as, e.g., a laundry facility, a commercial kitchen, a pet wash or kennel, an art room sink, a barber shop or hair salon, or a food processing facility. The solids interceptor 10 may be a point-of-use solids interceptor and thus placed directly below a plumbing fixture being serviced such as, e.g., a sink or the like, which will be discussed in connection with FIGS. 11A and 11B. A drainpipe from the fixture is connected to the inlet 20 of the solids interceptor 10, and at least one of the outlets 22, 24 and 26 is connected to a drain line that continues to a septic tank, sewer system, or other disposal site. The unused outlet(s) 22, 24, and 26 are sealed with a watertight cap 72, 74.

As solids-laden wastewater leaves the fixture, it enters the cylindrical tank 18 via the inlet 22 and flows into the filter tray 50 via the upward facing open end thereof. The filter tray 50 filters the wastewater thus collecting the solid waste therefrom, while permitting liquid waste to flow through the filter tray 50's perforated walls and ultimately out of the cylindrical tank 18 via one of the outlets 22, 24, and 26, where it is then piped to a disposal site. The removable basket assembly 14, and thus the integral filter tray 50 thereof, is periodically accessed and removed from the main body 12 via the open end 28 to remove and discard the solid waste collected therein.

To install the removable basket assembly 14 into the main body 12, a user grasps the handle 44 and moves the basket assembly 14 in a generally horizontal, axial direction towards an interior of the main body 12 and, more particularly, towards the closed end 30 of the main body 12. The main body 12 includes a post 68 projecting in the axial direction from a top of the closed end 30, and the removable basket assembly 14 includes a corresponding slot 70 in the distal end wall 56 to receive the post 68. In this regard, the removable basket assembly 14 can only be installed in one orientation. If a user were to mistakenly install the basket assembly 14 upside down, for instance, a portion of the distal end wall 56 that does not include the slot 70 would engage the post 68, prohibiting the user from inserting the removable basket assembly 14 fully into the main body 12. In such instances, the user simply rotates the removable basket assembly 14 until it is in the correct orientation (that is, when the open upper end of the filter tray 50 is facing upward) and then insert the basket assembly 14 further via the slot 70 receiving the post 68.

When the removable basket assembly 14 is almost fully inserted into the main body 12, each boss 48 will be received within a corresponding one of the grooves 34, and more particularly within the first leg 36 of the groove 34. As the user continues to insert the basket assembly 14 into the main body 12, each boss 48 generally follows the corresponding groove 34, including moving in the generally axially direction while in the first leg 36 and the generally circumferential direction while in the second leg 38. In this regard, once the bosses 48 are in the grooves 34, the user twists the handle 44 in a clockwise direction (in some embodiments, between 10 and 30 degrees, and in some embodiments between 15 and 25 degrees, and in some embodiments approximately 17 degrees, and in still other embodiments approximately 20.56 degrees) until the boss 48 passes over the elbow 42 and thus reaches the boss seat 40 at the distal end of the second leg 38.

Again, in some embodiments the removable basket assembly 14—and more particularly the cover 46 of the removable basket assembly 14—will include a circumferentially extending seal groove 66 including a seal 16 such as an O-ring or the like received therein. In such embodiments, as the bosses 48 are received in the corresponding grooves 34, the seal 16 becomes compressed between the main body 12 and the cover 46, forming a watertight seal. More particularly, the main body 12 may include an internal circumferentially extending corner 64 at the transition between the cylindrical tank 18 and the receiving portion 32. As the removable basket assembly 14 is twisted and locked into place via the bosses 48 following the grooves 34, the seal 16 presses against the corner 64 and becomes compressed between the corner 64 and the seal groove 66, forming the watertight seal. Because the seal 16 is compressed against the corner 64, when compressed a first portion of the seal 16 will press against a first face of the corner 64, a second portion of the seal 16 will press against a second face of the corner 64, a third portion of the seal 16 will press against a first face of the seal groove 66, and a fourth portion of the seal 16 will press against a second face of the seal groove 66. Thus, the sealing interface creates a "quad seal"; i.e., the compressed seal 16 creates two separate face seals on each perpendicular face of the corner 64 and two separate face seals on each perpendicular face of the seal groove 66, resulting in increased sealing performance as compared to known seals that are compressed against only one mating face.

In some embodiments, compressing the seal 16 results in a biasing force that serves to hold the various components of the solids interceptor 10 in the assembled state. More particularly, the compressed seal 16 (FIG. 5) presses back against the main body 12 and the cover 46. This in turn biases the bosses 48 axially outward (that is, away from the main body 12). Because the grooves 34 include the elbow 42, with at least a portion of the boss seat 40 extending axially outward from the elbow 42 (as discussed), the bosses 48 become pressed and locked into the boss seat 40 and held in place by the biasing force of the seal 16, which in turn locks the removable basket assembly 14 in place.

When removing the basket assembly 14 from the main body 12, the user will turn the removable basket assembly 14 counterclockwise (again, in some embodiments between 10 and 30 degrees, and in some embodiments between 15 and 25 degrees, and in some embodiments approximately 17 degrees, and in still other embodiments approximately 20.56 degrees) before pulling axially outwardly on the handle 44 and thus removing the basket assembly 14 from the main body. In this regard, because of the relatively minor rotation needed to lock, and unlock, the removable basket assembly 14 in place, the basket assembly 14 can be easily removed without spilling the solid waste accumulated in the filter tray 50.

The solids interceptor 10 exhibits many advantages over known point-of-use and similar solids interceptors. First, in some embodiments the removable basket assembly 14 and/or portions thereof such as the handle 44, cover 46, and/or filter tray 50 may be constructed from a clear material such as clear or semi-transparent thermoplastic (such as, e.g., polycarbonate or other thermoplastic) or the like. In this regard, a user can easily inspect the solids interceptor 10 and determine if the filter tray 50 needs to be emptied without dissembling the solids interceptor 10. Moreover, because the filter tray 50 is an integral component of the removable basket assembly 14, a user cannot omit the filter tray 50 when assembling the solids interceptor 10. This is because if the filter tray 50 is not placed within the solids interceptor 10, there will be a hole in the plumbing system because the cover 46, which is integrally formed with the filter tray 50, will similarly be absent from the solids interceptor 10. A user thus must replace the filter tray 50 (and thus the integral cover 46) to seal the plumbing system. This omits the "abandoned filter" problem common with known solids interceptors, in which a user may leave out the filter after emptying the solids interceptor, thus rendering the interceptor useless for separating solids from wastewater.

The handle 44, bosses 48, and grooves 34 mating configuration allows a user to access the filter tray 50 quickly and easily without the need for special tools such as a pipe wrench or the like. Instead, the user simply grasps the handle 44, turns, and pulls to fully access the filter tray 50. The internal post 68 and corresponding slot 70 in the basket assembly 14's distal end wall 56 ensures that the user can only install the basket assembly 14 in the correct configuration—that is, with the open end of the filter tray 50 facing upward. And the distal end wall 56 bearing against the cylindrical tank 18 during install and removal of the removable basket assembly 14 serves as guide for keeping the filter tray 50 level and thus keeping the solids accumulated therein within the tray 50 during removal, as well as scrapes the internal surface of the cylindrical tank 18 to remove any solids or other waste that may have accumulated thereon.

Still more, the basket assembly 14 construction provides for easy cleaning of the solids interceptor 10, because the captured solids will be caught within the filter tray 50 (due to an open upper end thereof directly facing the inlet 20), and thus the user can simply dump the tray 50 after removing the removable basket assembly 14 from the main body 12 to fully empty solid waste from the solids interceptor 10. In this regard, there is no need to vacuum or otherwise clean out an interior of the cylindrical tank 18.

Figure 4:
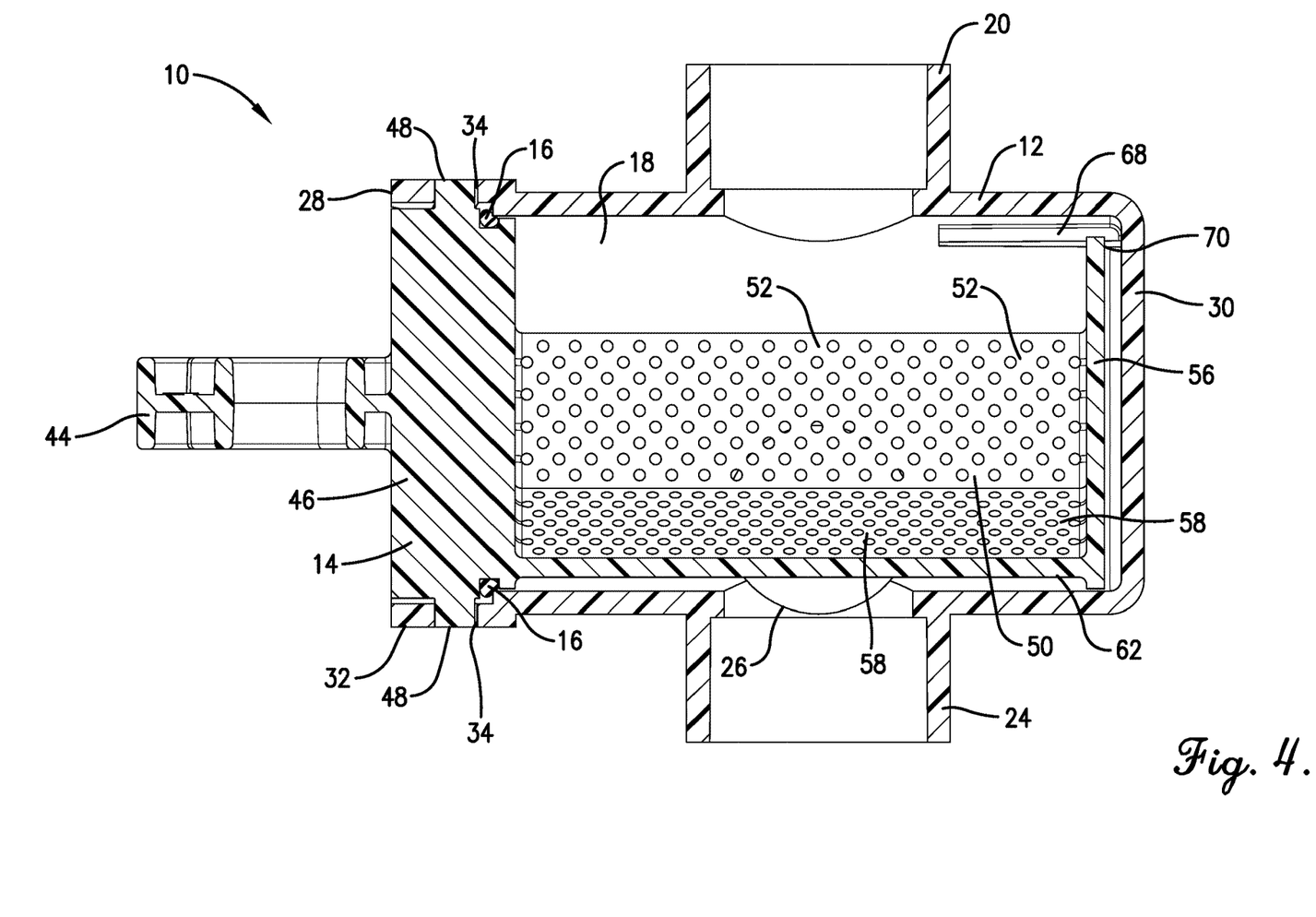
FIG. 4 is a cross-sectional view of the solids interceptor shown in FIGS. 1-3 as viewed along line 4-4 in FIG. 2.
Figure 5:
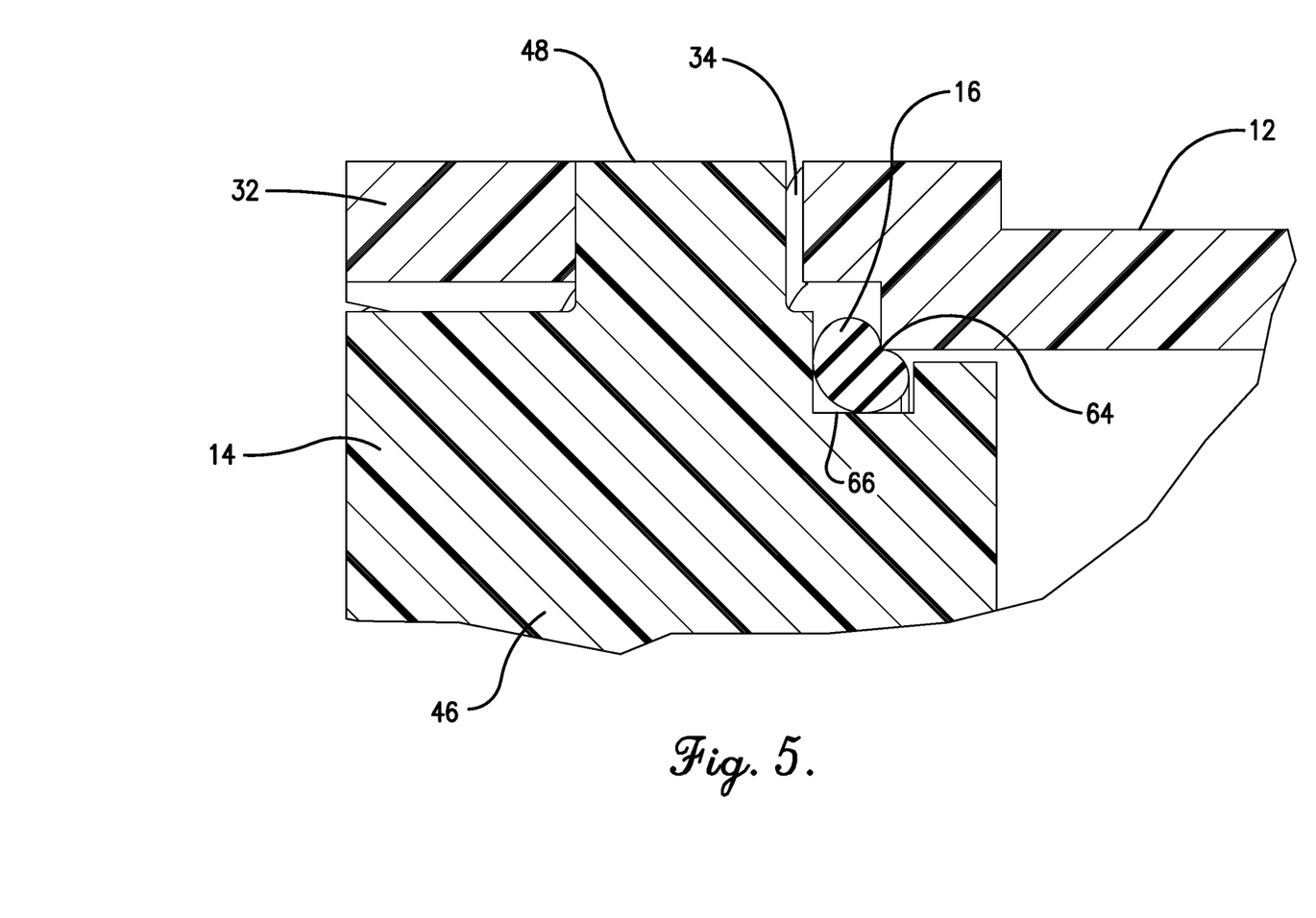
FIG. 5 is an enlarged view of a portion of the solids interceptor shown in FIG. 4.

The plurality of outlets 22, 24, and 26 provide a choice of installation configuration, and thus the solids interceptor 10 is suitable for a variety of plumbing configurations and applications. And as best seen in FIGS. 2 and 4, each outlet 22, 24, 26 includes at least a portion thereof that is lower than the lowermost portion of the cylindrical tank 18 and the lowermost portion of the open end 28 of the main body 12, resulting in no static water line within the solids interceptor 10. Thus, regardless of which outlet 22, 24, and 26 is chosen during install, there will be no standing water within the solids interceptor 10 during service and the user can simply remove the removable basket assembly 14, empty the filter tray 50, and replace the basket assembly 14 without wastewater running out of the open end 28 of the main body 12.

Figure 8:
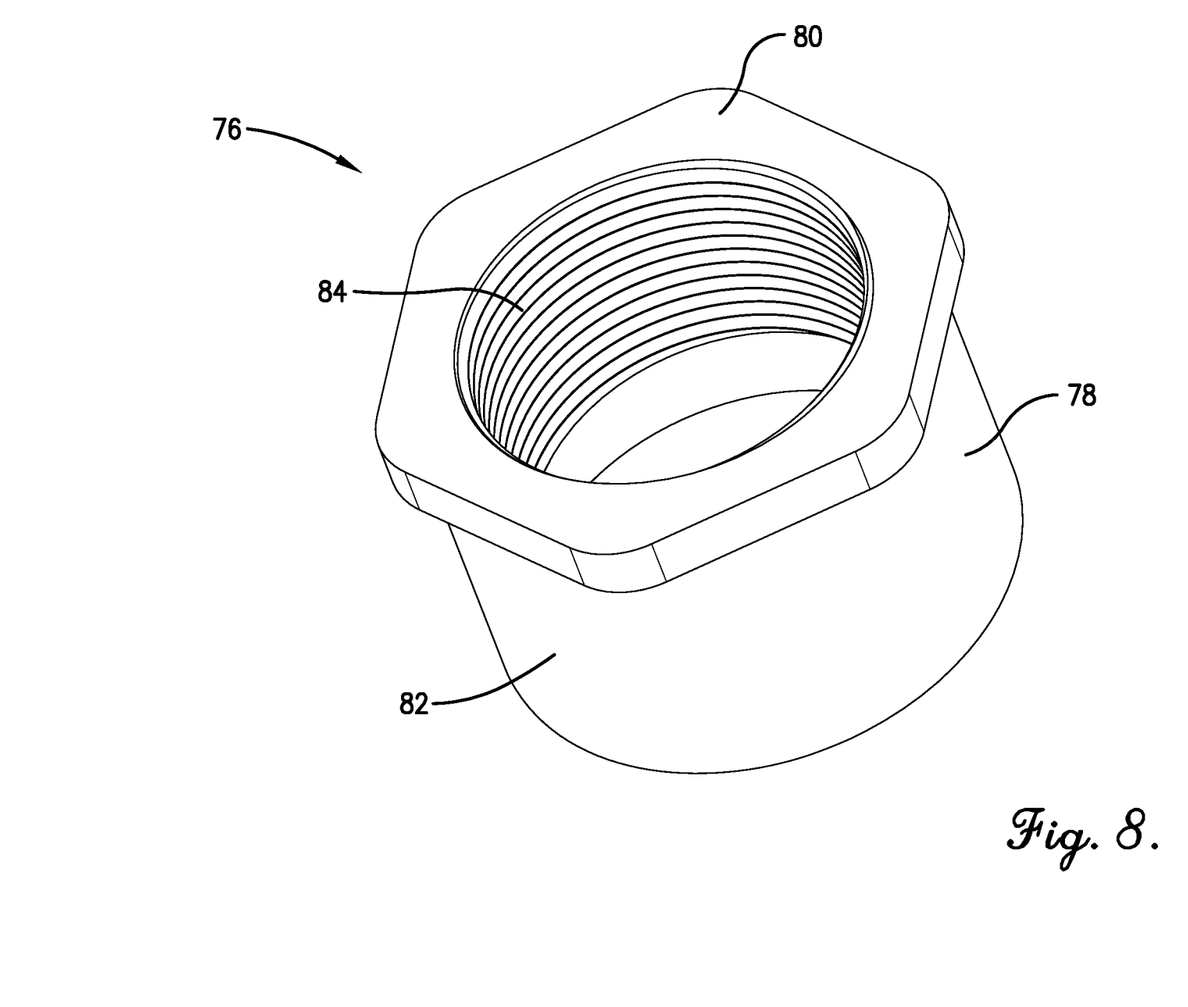
FIG. 8 is a perspective view of a coupler adapter configured to be used with a solids interceptor such as the solids interceptor shown in FIGS. 1-5 and 7.
Figure 9:
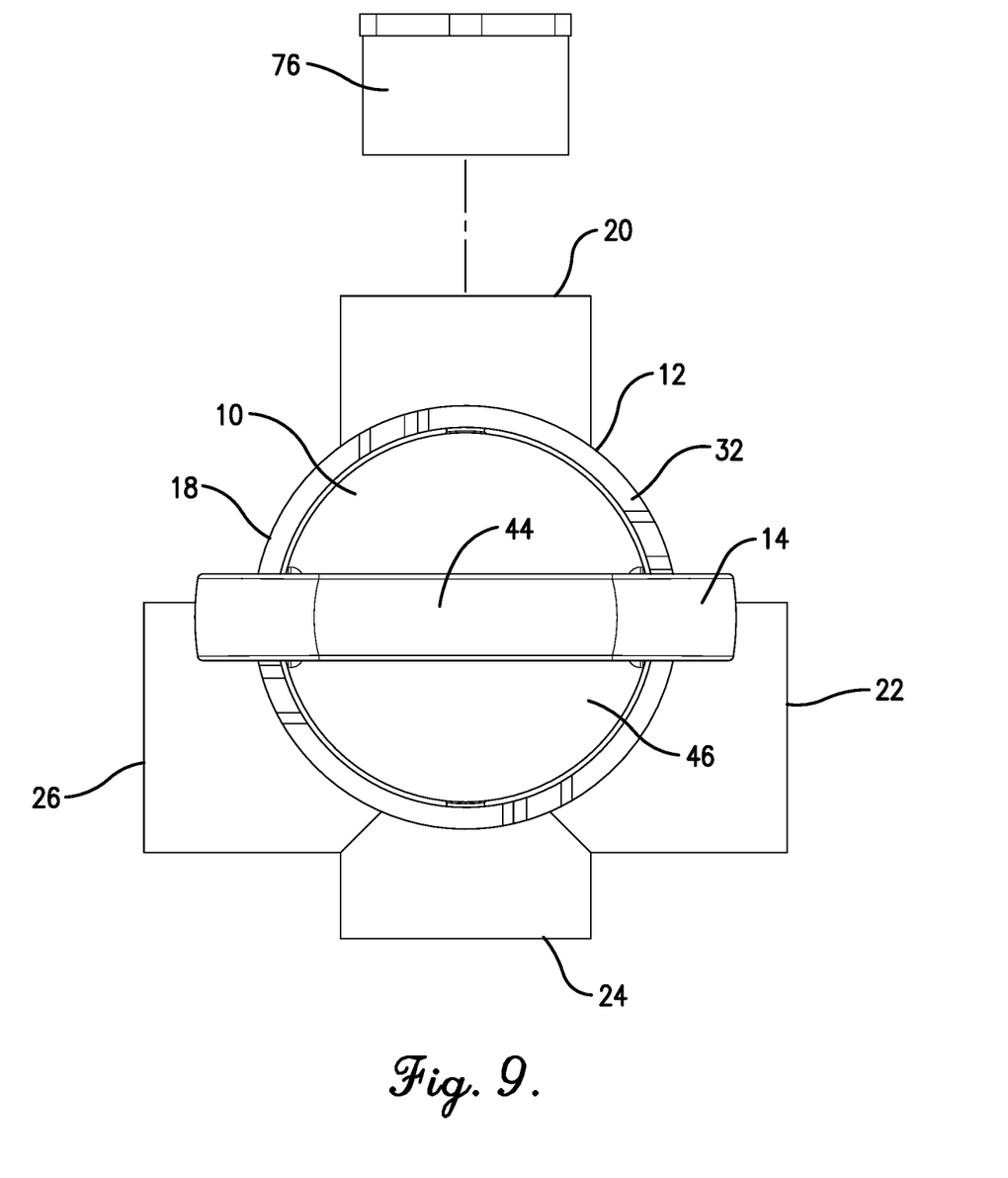
FIG. 9 is a front view of the solids interceptor shown in FIGS. 1-5 and including the coupler adapter shown in FIG. 8.
Figure 10:
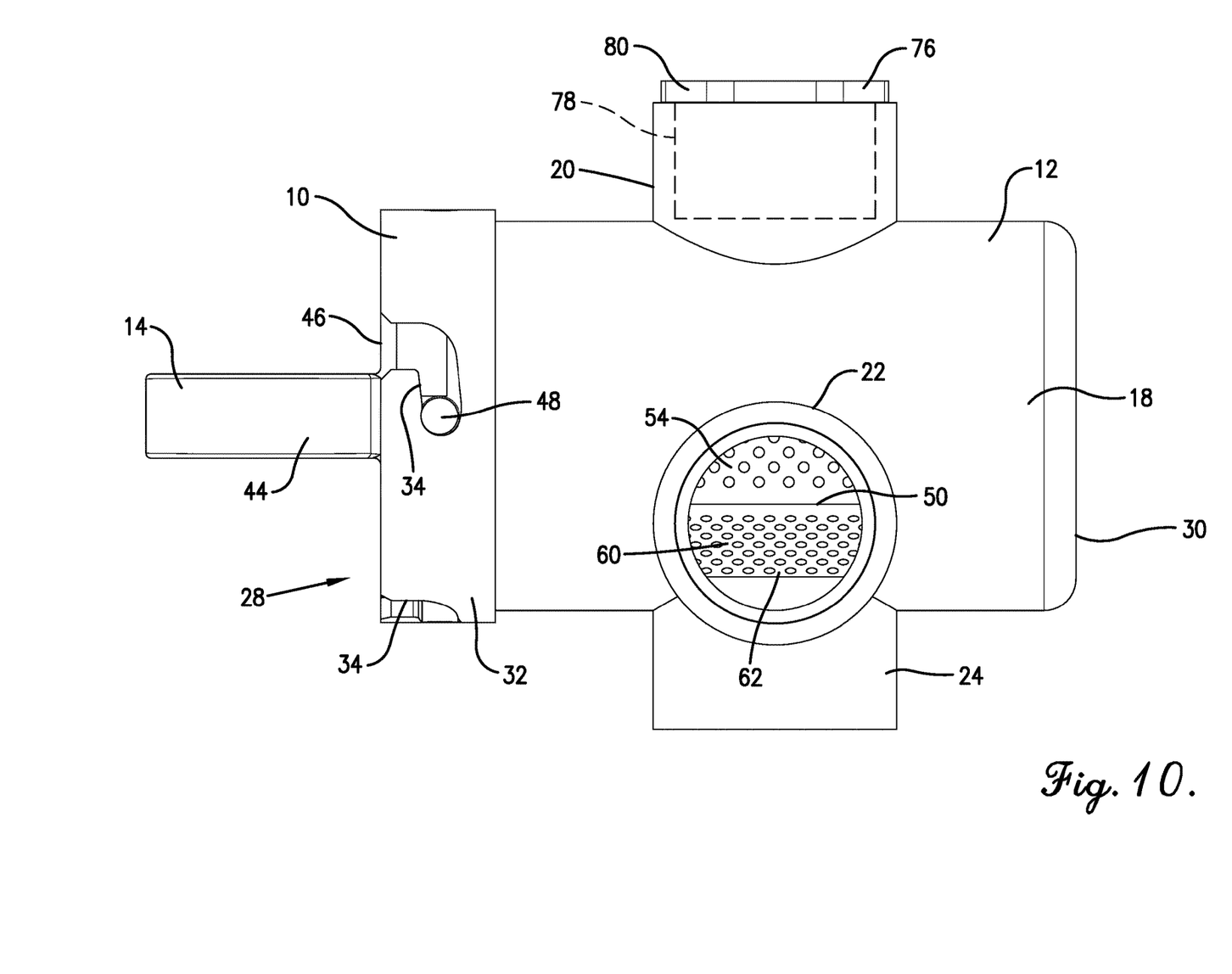
FIG. 10 is a side view of the solids interceptor and coupler adapter shown in FIG. 9 with the coupler adapter shown in an installed position.

In some embodiments, the solids interceptor 10 may be used in connection with a coupler adapter 76 as seen in FIGS. 8-10. At a high level, the coupler adapter 76 includes a tubular body 78 including a substantially cylindrical outer surface 82 and opposing substantially cylindrical inner surface 84. One or both of the outer surface 82 and the inner surface 84 may be threaded and thus configured to mate to a threaded pipe or other coupler. For example, in the depicted embodiment, the outer surface 82 is smooth but the inner surface 84 is threaded. In other embodiments, the outer surface 82 may be threaded in addition to or instead of the inner surface 84, or else both surfaces 82, 84 may be smooth without departing from the scope of the invention.

The coupler adapter 76 may, in some embodiments, include a ring 80. The ring 80 may be provided at an uppermost end of the tubular body 78 and, in some embodiments, may include a substantially hexagonal outer perimeter. In such embodiments, the ring 80 may be configured to be engaged by a tool (such a pipe wrench or similar) when the coupler adapter 76 is being threaded onto a plumbing component such as a drainpipe or similar.

The coupler adapter 76 is configured to assist with coupling the solids interceptor 10 to a drainpipe of a plumbing fixture such as a sink or the like. For example, many known drainpipes exiting a fixture include a pipe with a threaded end such as, in one non-limiting example, a 1½-inch National Pipe Straight (NPS) threaded pipe. The coupler adapter 76 may thus be, e.g., a 2-inch by 1½-inch NPS adapter. That is, the outer diameter of the coupler adapter 76 (i.e., the diameter of outer surface 82) may be sized and configured to be received by a pipe having a nominal size of 2 inches, while the inner diameter of the coupler adapter 76 (i.e., the diameter of the inner surface 84) may be sized and configured to be threaded onto 1½-inch NPS threaded pipe. More particularly, when used to couple a 2-inch schedule 40 PVC inlet 20 of the solids interceptor 10 to a 1½-inch NPS drainpipe, the diameter of the outer surface 82 of the coupler adapter 76 may be approximately 2.067 inches, while the diameter of the inner surface 84 of the coupler adapter 76 by be 1.900 inches and include threads configured to mate with the 1½-inch NPS threaded drainpipe.

The coupler adapter 76 may ease coupling of the solids interceptor 10 while providing for a relatively compact installation. As best understood with reference to FIGS. 9 and 10, when the coupler adapter 76 is used, the threaded end of a drainpipe, which couples to the inner surface 84 of the coupler adapter 76, will be received within an interior of the first inlet 20. The inner surface 84 of the coupler adapter 76 is threaded onto a threaded end of the drainpipe. Again, this may be accomplished by grasping the hexagonal ring 80 and hand-tightening the coupler adapter 76 onto a drainpipe. In some embodiments, a user may use pipe wrench or similar to engage and turn the hexagonal ring 80 thereby threading the coupler adapter 76 onto the drainpipe. The solids interceptor 10, and more particularly the inlet 20 thereof, is slid onto the outer surface 82 of the coupler adapter 76 (FIG. 9) and secured to the coupler adapter 76 via PVC cement or similar.

As best seen in FIG. 10, a majority of the axial length of the coupler adapter 76 can be received within an interior of the inlet 20. More particularly, in some embodiments, when fully installed the tubular body 78 of the coupler adapter 76 is received within the inlet 20, with the ring 80 abutting the open upper end of the inlet 20. This allows for a relatively compact installation position because the drainpipe is partially received within the solids interceptor 10.

Figure 11A:
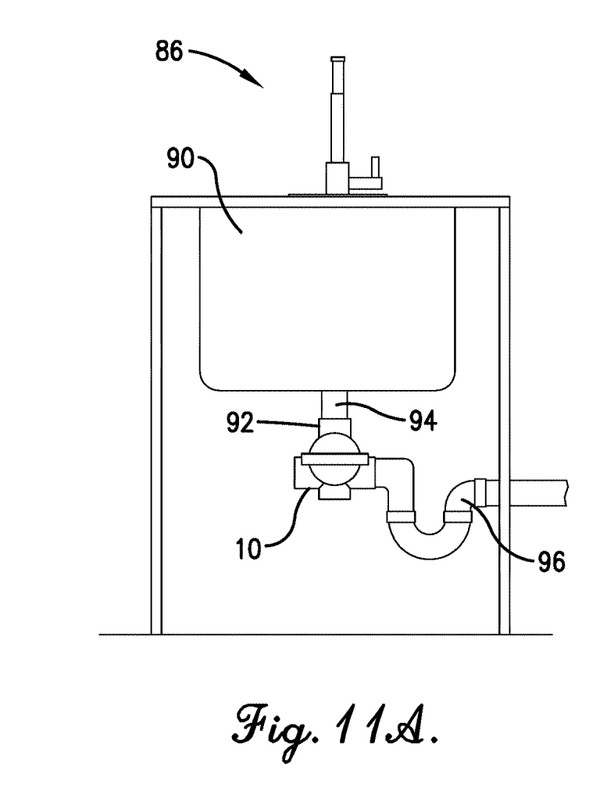
FIGS. 11A and 11B are schematic views of two example installations of solids interceptors according to aspects of the invention such as the solids interceptors shown in FIGS. 1-5, 7, and/or 9-10.
Figure 11B:
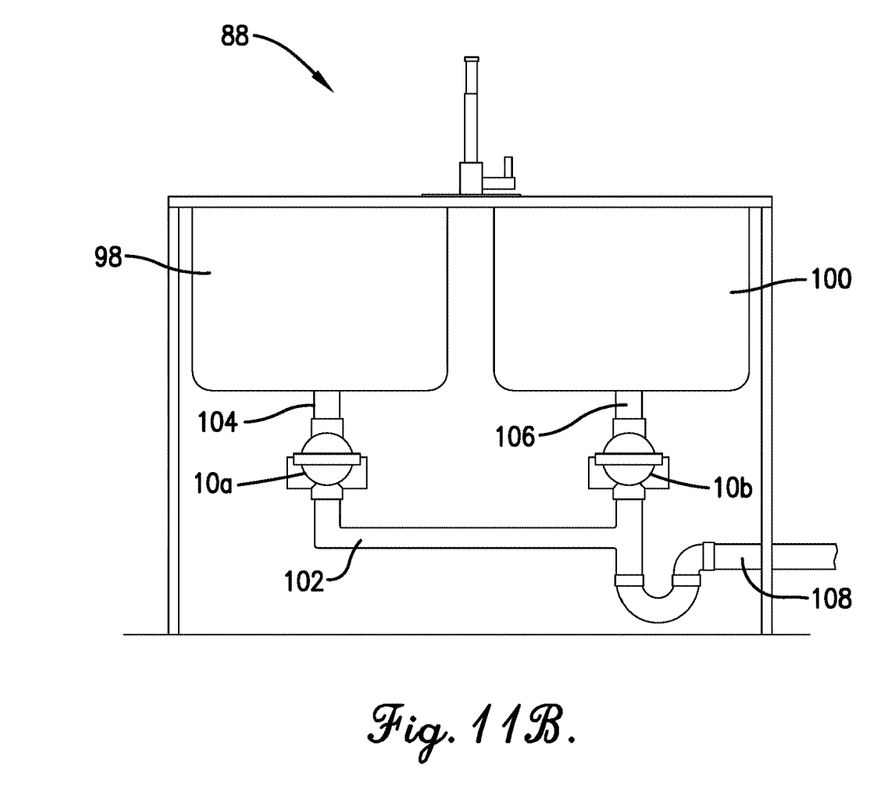

A method of installing the solids interceptors 10 will now be discussed in detail in connection with FIGS. 11A and 11B, which show two potential installation configurations 86, 88 of embodiments of the solids interceptor. The first installation configuration 86 shows a single solids interceptor 10 included as part of a plumbing system 92 that includes a single plumbing fixture 90 (e.g., a sink), while the second installation configuration 88 shows two solids interceptors 10a, 10b included as part of a plumbing system 102 that includes two plumbing fixtures 98, 100. Other configurations including plumbing systems including more or less plumbing fixtures and/or solids interceptors 10 could be employed without departing from the scope of the invention.

The solids interceptors 10, 10a, 10b are installed along a facility's drainage system such as along a utility sink's drain line where solids are regularly disposed. To install the solids interceptors 10, 10a, 10b, the plumbing system 92, 102 below the fixture 90, 98, 100 being serviced is accessed and the main body 12 of the solids interceptor 10 is coupled to the respective drainpipe 94, 104, 106 such that wastewater leaving the fixture will flow through the through the inlet 20 and into the cylindrical tank 18 of the main body 12. The drainpipes 94, 104, 106 are coupled to the inlet 20 using any well-known technique. Again, in some embodiments the coupler adapter 76 could be provided between the inlets 20 of the solids interceptors 10, 10a, 10b and the drainpipes 94, 104, 106, as discussed in connection with FIGS. 8-10.

A drain line 96, 108 leading to a disposal site—such as, e.g., a septic tank, sewer system, a wastewater treatment facility, or other disposal site—is coupled to one of the outlets 22, 24, and 26. The appropriate outlet 22, 24, and 26 is chosen based on the architecture of the drainage system and/or based on the specific application of the solids interceptor 10. For example, in the first installation configuration 86, a side outlet (i.e., the first outlet 22) is utilized to accommodate the particular plumbing system 92 architecture, while in the second installation configuration 88, a bottom outlet (i.e., the second outlet 24) is utilized to accommodate the particular plumbing system 102 architecture. Moreover, and although not shown, if desired, more than one of the outlets 22, 24, and 26 may be used. As discussed in connection with FIG. 7, a watertight cap 72, 74 is in turn coupled to each unused outlet 22, 24, and 26 to prevent wastewater from leaking out the unused outlet.

Finally, the seal 16 is placed within the seal groove 66, and the removable basket assembly 14 is installed into the main body 12 as described above. That is, the removable basket assembly 14 is installed by sliding the removable basket assembly 14 axially into the open end 28 of the main body 12 with the open end of the filter tray 21 facing upwards so that the slot 70 of the distal end wall 56 receives the post 68, and then rotating the handle 44 clockwise slightly to compress the seal 16 and rotate the bosses 48 past the respective elbows 42 locking the removable basket assembly 14 in place via each of the bosses 48 being fully seated in a respective boss seat 40, as discussed. Again, the basket assembly 14 must be placed into the main body 12 in order to seal the respective plumbing systems 92, 102 (because the cover 46 is integral to the filter tray 50) thereby eliminating the "abandoned filter" problem of known solids interceptors. Once the solids interceptor 10 is fully installed in this manner, the plumbing system 92, 102 can be used and any wastewater draining from the fixture 90, 98, 100 will thus pass through the solids interceptor 10, 10a, 10b and more particularly through the filter tray 50, which removes any solid waste therefrom as described.

Again, the embodiments of the invention described herein provides many benefits over known solids interceptors as described above and as follows. First, in some embodiments the unique seal 16 and corner 64 interface creates two separate face seals on each perpendicular face of the corner 64. This can be accomplished with a very small rotation of the basket assembly such as, in one non-limiting example, between 17 and 23 degrees of rotation and, more particularly, 20.56 degrees of rotation.

In some embodiments the solids interceptor 10 is a unique side-access interceptor having 360 degrees of freedom plus 180 degrees bottom installation capability. That is, the solids interceptor 10 can be turned 180 degrees, with outlets 22, 26 on both sides, which allows for 360-degree horizontal installation with the basket assembly 14 handle 44 always facing towards the user. The solids interceptor 10 can also be installed on an angle, such as an angle up to 45 degrees, allowing for 180 degrees freedom on the bottom outlet 22, 24, 26, in conjunction with the horizontal freedom.

In some embodiments the solids interceptor 10 overcomes the known "abandoned basket" problem. Once the solids interceptor 10 is installed, the basket assembly 14 cannot be discarded without creating a hole in the plumbing system. Thus, the basket assembly 14 must be continually installed after first being installed. This means the basket assembly 14, and more particularly the filter tray 50 thereof, will be intercepting solids for the life of the unit. This also means that the basket assembly 14 will have to be continuously maintained because otherwise the plumbing system could experience slow draining or backup, thus ensuring the solids interceptor 10 appropriately prevents solids from continuing to a disposal site.

In some embodiments the coupler adapter 76 allows a basket strainer of a sink or other fixture to be mechanically coupled to the solids interceptor 10. This allows the basket strainer of the fixture to sit essentially inside the solids interceptor 10, and more particularly within the inlet 20, decreasing the overall vertical footprint and standing water in the solids interceptor 10.

In some embodiments the basket assembly 14 is a one-piece handle 44, filter tray 50, and cover 46 assembly. Thus, when accessing the tank 18 via the handle 44, in one fluid motion the seal between the basket assembly 14 and the tank 18 is broken, and the handle 44, cover 46, and filter tray 50 are removed, including the solids contained within the filter tray 50. When reinstalling the basket assembly 14, the assembly 14 is inserted by the handle 44 into the tank 18, and with one fluid motion, the solids interceptor 10 is re-sealed and ready to intercept solids again.

In some embodiments, the basket assembly 14 can only be installed in the correct orientation. This is because there is a post 68 molded into the rear of the tank 18 that prevents the basket assembly 14 from being inserted in any incorrect orientation. There is a corresponding slot 70 in the end face 56 of the basket assembly 14 that accepts the post 68. The solids interceptor 10 will only be allowed to be fully inserted past the face of the tank 18 if it is inserted in the correct orientation, where the post 68 and the slot 70 are aligned. If it is inserted in any other direction, the basket assembly is hung-up on the post 68 and the bosses 48 and corresponding grooves 34 cannot engage.

In some embodiments, the solids interceptor 10 has three outlets 22, 24, 26 built-in to the tank 18. Any of the outlets 22, 24, 26 can be used with optimal performance to the end user. This allows for great installation flexibility for a sure fit in any installation situation.

In some embodiments, no static water remains in the filter tray 50 when water is not running through the solids interceptor 10 regardless of which outlet 22, 24, 26 is chosen. This is because the invert of each outlet 22, 24, 26 is below the lowest point of the filter tray 50. This means, given proper installation, that the filter tray 50 will always be dry when water is not flowing. This allows for no-mess basket assembly 14 pull. That is, the basket assembly 14, and more particularly the filter tray 50, will be dry and neither water nor solids will drip onto the ground when the basket assembly 14 is removed.

In some embodiments, the solids interceptor 10 includes a self-cleaning housing. When removing the basket assembly, an interior surface of the tank 18 is scraped clean by the correspondingly sized and shaped end wall 56 of the filter tray 50. This allows the tank 18 to be fully cleaned with each maintenance.

And in some embodiments, the solids interceptor 10 permits hands-free solids removal. Because the filter tray 50 and the handle 44 form part of an integral basket assembly 14, coupled with the ease of removal of the basket assembly 14 and the ease of evacuating the filter tray 50 itself, the end-user will not have to soil their hands with solids. Instead, a user can maintain and empty the solids interceptor 10 without ever needing to get their hands dirty on the contained solids. The basket assembly 14 can simply be removed and evacuated into any waste receptacle.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations.

We claim:

1. A solids interceptor for separating solid waste from wastewater in a plumbing system, the solids interceptor comprising:
   a tank including an open end, a wastewater inlet, and one or more wastewater outlets; and
   a basket assembly removably attachable to the tank via the open end between an operable position and a removed position,
   wherein, when the basket assembly is in the operable position, the basket assembly seals the open end of the tank and the plumbing system, and wherein, when the basket assembly is in the removed position, the open end of the tank and the plumbing system are open to a surrounding environment,
   wherein the basket assembly includes a cover configured to seal the open end of the tank when the basket assembly is in the operable position, a handle extending from a first end of the cover, and a filter tray extending from an opposing end of the cover, the filter tray including a plurality of perforated walls, and
   wherein the handle, the cover, and the filter tray form an integral, molded assembly,
   wherein the tank includes a closed end and a post projecting in an axial direction from the closed end, wherein the basket assembly includes a distal end wall including a slot, and wherein, when the basket assembly is in the operable position, the post is received within the slot.

2. The solids interceptor of claim 1, wherein, when the basket assembly is in the operable position, the basket assembly is configured to receive wastewater flowing into the tank via the inlet and separate solid waste therefrom, and to permit liquid waste to exit the basket assembly and then the tank via the one or more wastewater outlets.

3. The solids interceptor of claim 1, wherein the filter tray is configured to receive wastewater flowing into the tank and separate solid waste therefrom, and wherein at least a portion of each of the one or more wastewater outlets is located below a lowermost portion of the filter tray.

4. The solids interceptor of claim 1, wherein the tank includes a receiving portion including a plurality of grooves, wherein the cover includes a plurality of bosses, and wherein, when the basket assembly is in the operable position, each of the plurality of bosses is received within a corresponding one of the plurality of grooves.

5. A solids interceptor for separating solid waste from wastewater in a plumbing system, the solids interceptor comprising:
   a tank including an open end, a wastewater inlet, and a plurality of wastewater outlets; and
   a basket assembly removably attachable to the tank via the open end between an operable position and a removed position, the basket assembly including a filter tray with one or more walls defining an open upper end,
   wherein, when the basket assembly is in the operable position, the basket assembly seals the open end of the tank and the plumbing system, and wherein, when the basket assembly is in the removed position, the open end of the tank and the plumbing system are open to a surrounding environment,
   wherein the basket assembly includes a cover configured to seal the open end of the tank when the basket assembly is in the operable position and a handle extending from a first end of the cover, the filter tray extending from an opposing end of the cover and including a plurality of perforated walls,
   wherein the handle, the cover, and the filter tray form an integral, molded assembly,
   wherein the plurality of wastewater outlets are configured such that a first outlet of the plurality of wastewater outlets extends away from an interior of the tank in a first direction, and such that a second outlet of the plurality of wastewater outlets extends away from the interior of the tank in a second direction, the second direction being oriented at an angle with respect to the first direction,
   wherein, when the basket assembly is in the operable position, the open upper end of the filter tray is configured to receive wastewater flowing into the tank via the inlet so that the basket assembly separates the solid waste from the wastewater and permits liquid waste to exit the basket assembly to the plurality of wastewater outlets,
   wherein the tank includes a closed end and a post projecting in an axial direction from the closed end, wherein the basket assembly includes a distal end wall including a slot, and wherein, when the basket assembly is in the operable position, the post is received within the slot.

6. The solids interceptor of claim 5, wherein the second direction is perpendicular to the first direction.

7. The solids interceptor of claim 5, wherein the plurality of wastewater outlets further includes a third outlet, wherein the first outlet and the third outlet extend in parallel and opposite directions to one another, and wherein the second outlet extends perpendicular to both the first outlet and the third outlet.

8. The solids interceptor of claim 5, further comprising a watertight cap coupled to one of the plurality of wastewater outlets.

9. The solids interceptor of claim 5, further comprising a coupler fitting configured to couple the solids interceptor to a drainpipe, wherein the coupler fitting is received within the wastewater inlet such that a majority of an axial length of the coupler fitting is within an interior of the wastewater inlet.

10. The solids interceptor of claim 5, wherein when the basket assembly is in the operable position, the open upper end faces the wastewater inlet.

11. The solids interceptor of claim 5, wherein the tank comprises:
an upper portion from which the wastewater inlet extends, and
a lower portion from which the plurality of wastewater outlets extend.

12. A solids interceptor for separating solid waste from wastewater in a plumbing system, the solids interceptor comprising:
a tank including an open end, a wastewater inlet, and one or more wastewater outlets; and
a basket assembly removably attachable to the tank via the open end between an operable position and a removed position, the basket assembly including a seal,
wherein, when the basket assembly is in the operable position, the basket assembly seals the open end of the tank and the plumbing system, and wherein, when the basket assembly is in the removed position, the open end of the tank and the plumbing system are open to a surrounding environment,
wherein the basket assembly includes a cover configured to seal the open end of the tank when the basket assembly is in the operable position, a handle extending from a first end of the cover, and a filter tray extending from an opposing end of the cover, the filter tray including a plurality of perforated walls,
wherein the handle, the cover, and the filter tray form an integral, molded assembly,
wherein the tank includes a sealing interface at the open end comprising a corner with a first face and a second face at an angle relative to the first face, and wherein, when the basket assembly is in the operable position, the seal is compressed at the sealing interface thereby creating a seal on the first face and the second face of the sealing interface,
wherein the tank includes a closed end and a post projecting in an axial direction from the closed end, wherein the basket assembly includes a distal end wall including a slot, and wherein, when the basket assembly is in the operable position, the post is received within the slot.

13. The solids interceptor of claim 12, wherein, when the basket assembly is in the operable position, the basket assembly is configured to receive wastewater flowing into the tank via the inlet and separate solid waste therefrom, and to permit liquid waste to exit the basket assembly and then the tank via the one or more wastewater outlets.

14. The solids interceptor of claim 12, wherein the first face is perpendicular with respect to the second face.

15. The solids interceptor of claim 12, wherein, when the basket assembly is in the operable position, the seal provides a watertight connection between the open end of the tank and the basket assembly.

16. The solids interceptor of claim 12, wherein the seal circumferentially extends about part of the cover.

17. The solids interceptor of claim 16, wherein the tank includes a receiving portion including a plurality of grooves, wherein the cover includes a plurality of bosses, and wherein, when the basket assembly is in the operable position, each of the plurality of bosses is received within a corresponding one of the plurality of grooves, with the seal compressed between the cover and the receiving portion.

* * * * *